United States Patent
Angeles et al.

(10) Patent No.: US 10,613,921 B2
(45) Date of Patent: *Apr. 7, 2020

(54) PREDICTIVE DISASTER RECOVERY SYSTEM

(71) Applicant: International Business Machines Corporation, Armonk, NY (US)

(72) Inventors: Eric S. Angeles, Leander, TX (US); Megan L. Bennett, Austin, TX (US); Fabio A. Gomez Diaz, Austin, TX (US); Shawn P. Mullen, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 15/842,914

(22) Filed: Dec. 15, 2017

(65) Prior Publication Data

US 2018/0107534 A1   Apr. 19, 2018

Related U.S. Application Data

(63) Continuation of application No. 15/138,276, filed on Apr. 26, 2016, now Pat. No. 9,898,359.

(51) Int. Cl.
*G06F 11/07* (2006.01)

(52) U.S. Cl.
CPC .......... *G06F 11/079* (2013.01); *G06F 11/076* (2013.01); *G06F 11/0709* (2013.01)

(58) Field of Classification Search
CPC ... G06F 11/0793; G06F 11/30; G06F 11/3058
(Continued)

(56) References Cited

U.S. PATENT DOCUMENTS

| 7,035,765 B2 | 4/2006 | Tanahashi |
| 7,343,302 B2 | 3/2008 | Aratow et al. |

(Continued)

FOREIGN PATENT DOCUMENTS

| JP | 2015510201 A | 4/2015 |
| WO | 2009155076 A2 | 12/2009 |

OTHER PUBLICATIONS

Mell et al., "The NIST Definition of Cloud Computing", Recommendations of the National Institute of Standards and Technology, NIST Special Publication 800-145, Sep. 2011, 7 Pages.

(Continued)

*Primary Examiner* — Chae M Ko
(74) *Attorney, Agent, or Firm* — Alexander G. Jochym; Edward J. Wixted, III; Brian M. Restauro

(57) ABSTRACT

Environmental data, associated with a first computer, is received. Social media data, associated with the first computer, is also received. A first severity value, based on the environmental data, is determined. A second severity value, based on the social media data, is determined. A first weighted severity score is determined. The first weighted severity score is a combination of the first and second severity values. One or more actions is determined. The determined action is one of a recovery point objective action or a recovery time objective action. Each action has a threshold. Whether the first weighted severity score is equal to or greater than any threshold associated with any action is determined. In response to determining that the first weighted severity score is equal to or greater than one or more thresholds, each action associated with each threshold is implemented.

20 Claims, 6 Drawing Sheets

(58) Field of Classification Search
USPC .................................................. 714/26, 47.2
See application file for complete search history.

(56) References Cited

U.S. PATENT DOCUMENTS

| | | | |
|---|---|---|---|
| 7,992,031 B2 | 8/2011 | Chavda et al. | |
| 9,098,457 B2 | 8/2015 | Towstopiat et al. | |
| 9,274,903 B1 | 3/2016 | Garlapati et al. | |
| 9,297,723 B1* | 3/2016 | Hofmann | G01M 99/00 |
| 2006/0031938 A1* | 2/2006 | Choi | G06F 21/552 |
| | | | 726/25 |
| 2008/0301175 A1 | 12/2008 | Applebaum et al. | |
| 2014/0245210 A1 | 8/2014 | Battcher et al. | |
| 2014/0257913 A1 | 9/2014 | Ball et al. | |
| 2015/0099481 A1 | 4/2015 | Maitre et al. | |
| 2015/0169024 A1 | 6/2015 | Jammer | |
| 2015/0317197 A1* | 11/2015 | Blair | G06N 7/005 |
| | | | 714/47.3 |
| 2016/0078695 A1 | 3/2016 | McClintic et al. | |
| 2016/0218933 A1 | 7/2016 | Porras et al. | |
| 2016/0307286 A1* | 10/2016 | Miasnik | G06Q 50/265 |
| 2017/0308421 A1 | 10/2017 | Angeles et al. | |
| 2018/0330242 A1* | 11/2018 | Dubois | G06N 5/04 |

OTHER PUBLICATIONS

IBM, "List of Patent Applications Treated As Related", Appendix P, Dated Dec. 15, 2017, 2 pages.

\* cited by examiner

| THRESHOLD | RPO | | RTO | |
|---|---|---|---|---|
| | ACTION | COST | ACTION | COST |
| 18 | SWITCH TO BACKUP DATACENTER | $900K | | |
| 15 | | | BRING NEW IT EQUIPMENT ON-LINE | $300K |
| 12 | NOTIFY BACKUP DATACENTER FOR SWITCH | $100K | CALL IN ADDITIONAL PERSONNEL | $50K |
| 9 | | | CHECK AVAILABLE IT EQUIPMENT (ON & OFF SITE) | $25K |
| 6 | RUN LOCAL BACKUPS | $4K | | |
| 3 | INCREASE SYNC FREQUENCY | $2K | NOTIFY PERSONNEL OF POSSIBLE EVENT | $1K |

FIG. 5

PREDICTIVE DISASTER RECOVERY SYSTEM

BACKGROUND OF THE INVENTION

The present invention relates generally to the field of disaster recovery, and more particularly to providing predictive disaster recovery of cloud services.

Disaster recovery (DR) involves a set of policies and procedures to enable the recovery or continuation of vital technology infrastructure and systems following a natural disaster or man-made event. Disaster recovery focuses on the information technology (IT) systems supporting critical business functions, as opposed to business continuity, which involves keeping all essential aspects of a business functioning despite significant disruptive events. Disaster recovery is therefore a subset of business continuity. A business continuity plan (BCP) includes planning for non-IT related aspects such as key personnel, facilities, crisis communication and reputation protection, and should refer to the disaster recovery plan (DRP) for IT related infrastructure recovery/continuity. IT disaster recovery control measures can be classified into the following three types: preventive measures (controls aimed at preventing an event from occurring), detective measures (controls aimed at detecting or discovering unwanted events), and corrective measures (controls aimed at correcting or restoring the system after a disaster or an event). Good disaster recovery plan measures dictate that these three types of controls be documented and exercised regularly. Two important measurable objectives in a disaster recovery plan are the Recovery Time Objective (RTO) and the Recovery Point Objective (RPO). The RTO is the goal, measured in time, for how quickly an IT system is back online after a downtime event. The RPO is the goal, also measured in time, for the point in time to which data must be restored to resume services after a downtime event. RPO is often thought of as the time between the last data backup and the time a downtime event occurred.

Some of the current art utilizes advanced technology for disaster predicting. For example, U.S. Pat. No. 7,035,765 B2, titled Disaster Predicting Method, Disaster Predicting Apparatus, Disaster Predicting Program, and Computer-Readable Recording Medium Recorded with Disaster Predicting Program states the following: "A disaster predicting method, a disaster predicting apparatus, a disaster predicting program, and a computer-readable recording medium recorded with a disaster predicting program, which automatically order satellite image data based on periodically observed or predicted natural phenomenon, and also automatically analyze the obtained satellite image data to predict a disaster, thereby enabling to deal promptly with a disaster." Requiring the use of satellite imagery may be a disadvantage for some datacenters.

SUMMARY

Embodiments of the present invention include a method for providing predictive disaster recovery of cloud services. In one embodiment, environmental data, associated with a first computer, is received. Social media data, associated with the first computer, is also received. A first severity value, based on the environmental data, is determined. A second severity value, based on the social media data, is determined. A first weighted severity score is determined. The first weighted severity score is a combination of the first and second severity values. One or more actions is determined. The determined action is one of a recovery point objective action or a recovery time objective action. Each action has a threshold. Whether the first weighted severity score is equal to or greater than any threshold associated with any action is determined. In response to determining that the first weighted severity score is equal to or greater than one or more thresholds, each action associated with each threshold is implemented. An advantage of this method of providing predictive disaster recovery is the inclusion of both environmental and social media data.

In another aspect, a method for providing predictive disaster recovery of cloud services includes studying the social media data. The methods of studying the social media data include natural language processing, predictive analytics, cognitive analysis, object recognition, and video analytics. The second severity value is determined based on the studied social media data. An advantage of this method is the several methods of studying the social media data which results in a thorough understanding of the social media data.

In yet another aspect, a computer program product includes program instructions for providing predictive disaster recovery of cloud services. The computer program product includes program instructions to receive environmental data associated with a first computer. The computer program product also includes program instructions to receive social media data associated with the first computer. The computer program product also includes program instructions to determine a first severity value based on the environmental data. The computer program product also includes program instructions to determine a second severity value based on the social media data. The computer program product also includes program instructions to determine a first weighted severity score. The first weighted severity score is a combination of the first and second severity values. The computer program product also includes program instructions to determine one or more actions. The determined action is one of a recovery point objective action or a recovery time objective action. Each action has a threshold. The computer program product also includes program instructions to determine whether the first weighted severity score is equal to or greater than any threshold associated with any action. In response to determining that the first weighted severity score is equal to or greater than one or more thresholds, the computer program product also includes program instructions to implement each action associated with each threshold. An advantage of this computer program product for providing predictive disaster recovery is the inclusion of both environmental and social media data.

In yet another aspect, a computer program product includes program instructions for studying the social media data. The computer program product also includes program instructions to study the social media data. The methods of studying the social media data include natural language processing, predictive analytics, cognitive analysis, object recognition, and video analytics. The computer program product also includes program instructions to determine the second severity value based on the studied social media data. An advantage of this computer program product is the several methods of studying the social media data which results in a thorough understanding of the social media data.

In yet another aspect, a computer system includes program instructions for providing predictive disaster recovery of cloud services. The computer system includes program instructions to receive environmental data associated with a first computer. The computer system also includes program instructions to receive social media data associated with the first computer. The computer system also includes program instructions to determine a first severity value based on the environmental data. The computer system also includes program instructions to determine a second severity value based on the social media data. The computer system also includes program instructions to determine a first weighted severity score. The first weighted severity score is a combination of the first and second severity values. The computer system also includes program instructions to determine one or more actions. The determined action is one of a recovery point objective action or a recovery time objective action. Each action has a threshold. The computer system also includes program instructions to determine whether the first weighted severity score is equal to or greater than any threshold associated with any action. In response to determining that the first weighted severity score is equal to or greater than one or more thresholds, the computer system also includes program instructions to implement each action associated with each threshold. An advantage of this computer program product for providing predictive disaster recovery is the inclusion of both environmental and social media data.

In yet another aspect, a computer system includes program instructions for studying the social media data. The computer system also includes program instructions to study the social media data. The methods of studying the social media data include natural language processing, predictive analytics, cognitive analysis, object recognition, and video analytics. The computer system also includes program instructions to determine the second severity value based on the studied social media data. An advantage of this computer program product is the several methods of studying the social media data which results in a thorough understanding of the social media data.

BRIEF DESCRIPTION OF THE DRAWINGS

FIG. 5 is an example table of weighted severity score threshold values, recovery point objective (RPO) actions, recovery time objective (RTO) actions and associated RPO/RTO costs, in accordance with an embodiment of the present invention.

DETAILED DESCRIPTION

Figure 1:
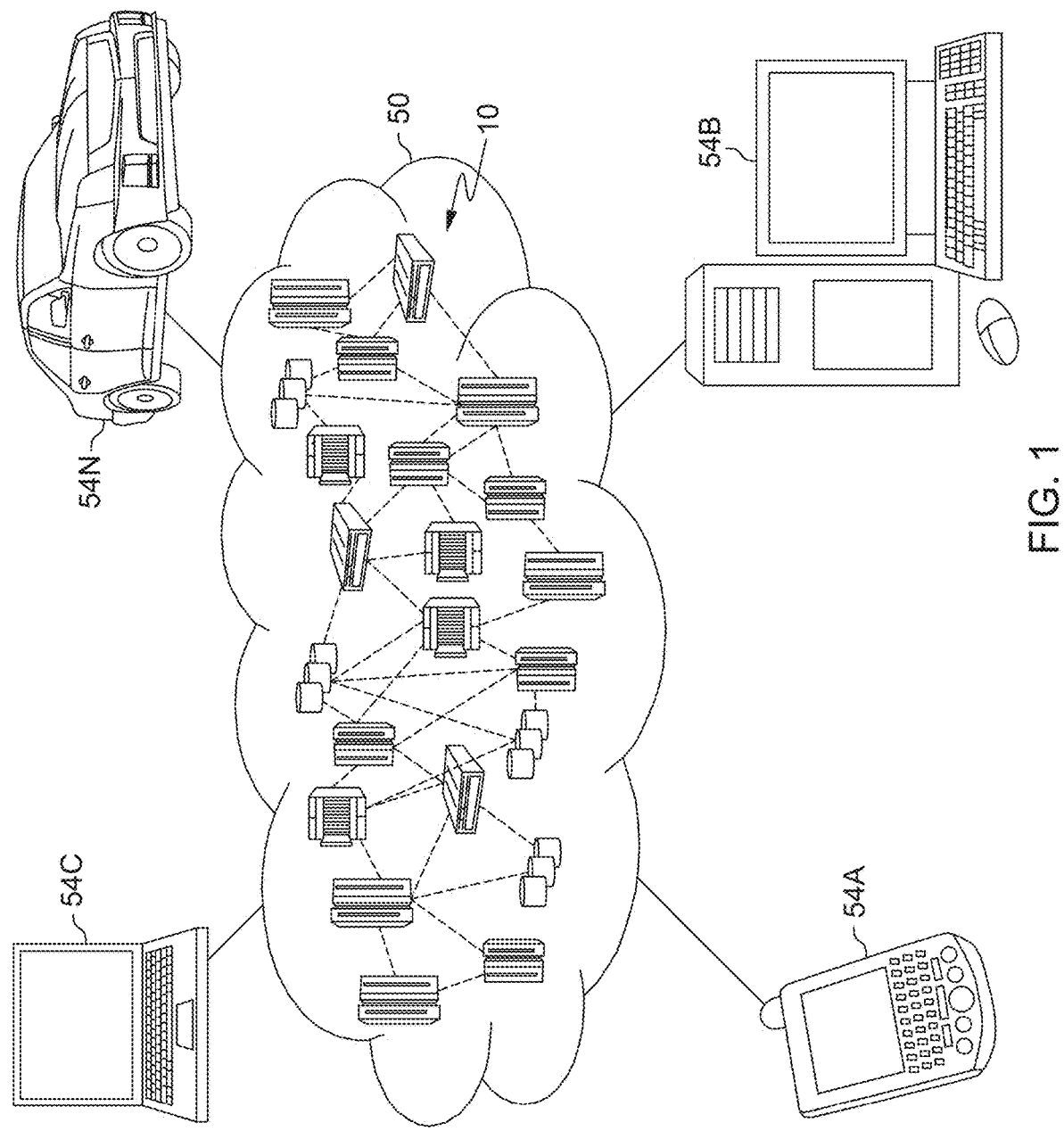
FIG. 1 depicts a cloud computing environment according to an embodiment of the present invention.

Some embodiments of the present invention recognize that datacenter downtime due to a natural disaster or man-made event may be expensive to both a service provider and the various customers of the service provider. For example, a credit card processing center is important to any number of retail businesses. If the credit card processing center is not available for any length of time, businesses may lose sales or worse than that, customers. In turn, the businesses may report the downtime to the banks that issue various credit cards and those banks may turn to another service provider for their credit card processing needs. A scenario such as this may result in a financial impact to all parties involved.

Embodiments of the present invention recognize that there may be a method, computer program product, and computer system for providing predictive disaster recovery of cloud services. The method, computer program product, and computer system may collect available environmental data (e.g., local weather data, severe weather data, etc.) as well as available social media data (e.g., text data, photo and/or video data, comments made to social media websites, etc.) and use the collected data to predict the likelihood of a datacenter interruption. Based on the prediction, preemptive action may be taken to reduce the chances of an interruption.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
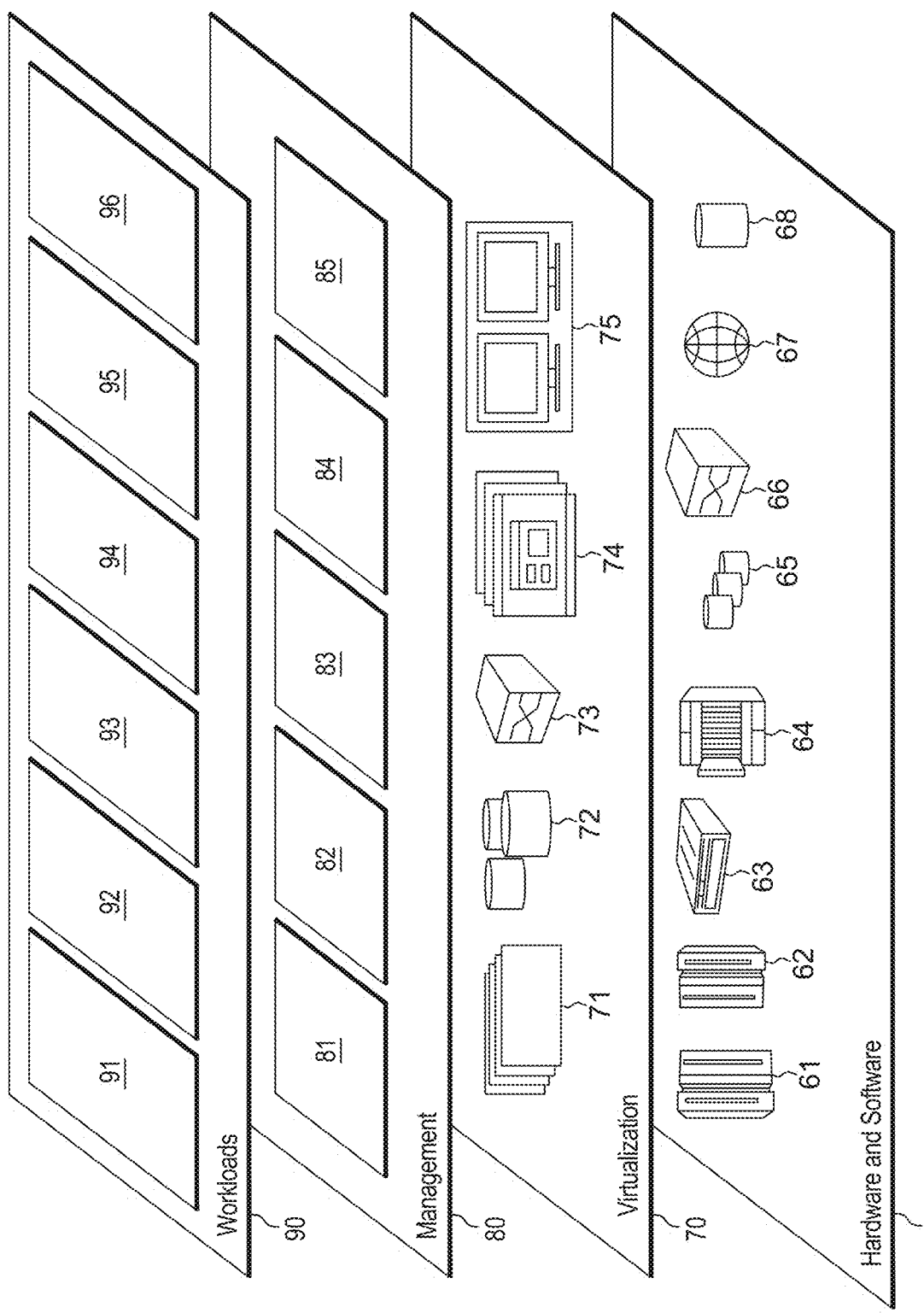
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prediction orchestrator 96.

Figure 3:
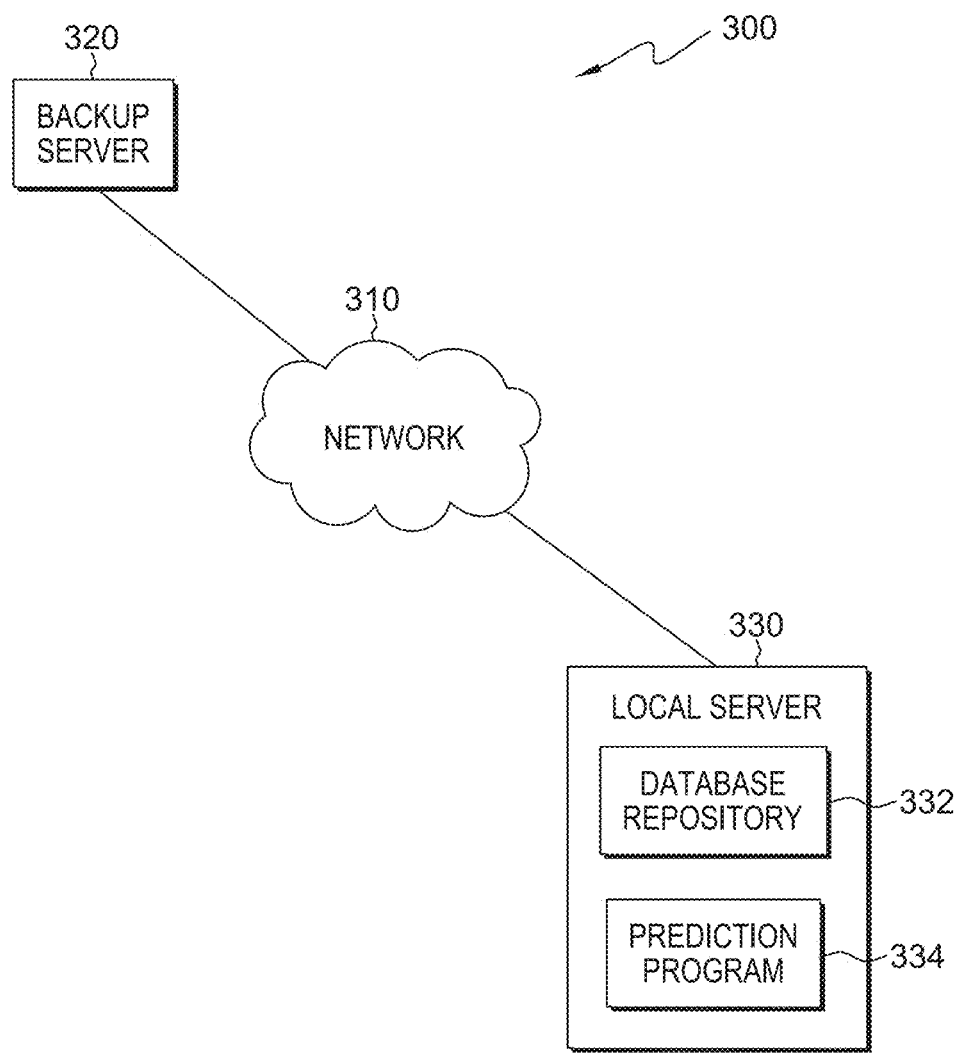
FIG. 3 is a functional block diagram of a computing environment, in accordance with an embodiment of the present invention.

FIG. 3 is a functional block diagram of a computing environment, generally designated 300, in accordance with an embodiment of the present invention. FIG. 3 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 300 includes backup server 320 and local server 330. Local server 330 includes database repository 332 and prediction program 334. Backup server 320 and local server 330 are interconnected via network 310. In example embodiments, computing environment 300 may include other computing devices not shown such as smartwatches, cell phones, smartphones, phablets, tablet computers, laptop computers, desktop computers, other computer servers or any other computer system known in the art, interconnected with backup server 320 and local server 330 over network 310.

In example embodiments, backup server 320 and local server 330 may connect to network 310 which enables backup server 320 and local server 330 to access any other computing devices and/or data not directly stored on backup server 320 or local server 330. Network 310 may be a local area network (LAN), a telecommunications network, a wide area network (WAN) such as the Internet, or any combination of the three, and include wired, wireless or fiber optic connections. Network 310 may include one or more wired and/or wireless networks that are capable of receiving and transmitting data, voice, and/or video signals, including multimedia signals that include voice, data, and video information. In general, network 310 may be any combination of connections and protocols that will support communications between backup server 320, local server 330, and other computing devices (not shown) within computing environment 300, in accordance with embodiments of the present invention.

In embodiments of the present invention, backup server 320 may be a laptop, tablet, or netbook personal computer (PC), a desktop computer, a personal digital assistant (PDA), a smartphone, or any other hand-held, programmable electronic device capable of communicating with local server 330 or any other computing device within computing environment 300. In certain embodiments, backup server 320 represents a computer system utilizing clustered computers and components (e.g., database server computers, application server computers, etc.) that act as a single pool of seamless resources when accessed by elements of computing environment 300. In general, backup server 320 is representative of any electronic device or combination of electronic devices capable of executing computer readable program instructions. In an embodiment, backup server 320 may serve as a backup server to local server 330 as needed (e.g., local server 330 is not operating correctly, local server 330 is removed from service for preventative maintenance, etc.). Computing environment 300 may include any number of backup server 320. Backup server 320 may include components as depicted and described in detail with respect to cloud computing node 10 in cloud computing environment 50, as described in reference to FIG. 1, in accordance with embodiments of the present invention. Backup server 320 may also include components as depicted and described in further detail with respect to FIG. 6, in accordance with embodiments of the present invention.

In an embodiment, local server 330 may be a laptop, tablet, or netbook personal computer (PC), a desktop computer, a personal digital assistant (PDA), a smartphone, or any other hand-held, programmable electronic device capable of communicating with backup server 320 or any other computing device within computing environment 300. In certain embodiments, local server 330 represents a computer system utilizing clustered computers and components (e.g., database server computers, application server computers, etc.) that act as a single pool of seamless resources when accessed by elements of computing environment 300. In general, local server 330 is representative of any electronic device or combination of electronic devices capable of executing computer readable program instructions. In an embodiment, local server 330 may require the services of backup server 320 (e.g., if local server 330 is not operating correctly, if local server 330 is removed from service for preventative maintenance, etc.). Computing environment 300 may include any number of local server 330. Local server 330 may include components as depicted and described in detail with respect to cloud computing node 10 in cloud computing environment 50, as described in reference to FIG. 1, in accordance with embodiments of the present invention. Local server 330 may include components as depicted and described in further detail with respect to FIG. 6, in accordance with embodiments of the present invention.

In an embodiment, database repository 332 may be storage that may be written to and/or read by backup server 320 and local server 330. In one embodiment, database repository 332 resides on local server 330. In other embodiments, database repository 332 may reside on backup server 320 or any other device (not shown) in computing environment 300, in cloud storage or on another computing device accessible via network 310. In yet another embodiment, database repository 332 may represent multiple storage devices within local server 330. Database repository 332 may be implemented using any volatile or non-volatile storage media for storing information, as known in the art. For example, database repository 332 may be implemented with a tape library, optical library, one or more independent hard disk drives, multiple hard disk drives in a redundant array of independent disks (RAID), solid-state drives (SSD), or random-access memory (RAM). Similarly, database repository 332 may be implemented with any suitable storage architecture known in the art, such as a relational database, an object-oriented database, or one or more tables.

According to embodiments of the present invention, database repository 332 may store a table of recovery point objective (RPO) actions and associated costs for a range of weighted severity score threshold values. In a like manner, database repository may store a table of (recovery time objective (RTO) actions and associated costs for a range of weighted severity score threshold values. In an embodiment, the RPO table and the RTO table are determined by a user, based on the location of the datacenter and the history of natural disasters and man-made events for that location, and stored to database repository 332. In various embodiments of the present invention, a natural disaster may be an event that affects the operations of a datacenter (e.g., a hurricane, a tornado, a flood, an earthquake, etc.) or an event which may turn into a situation that affects the operations of a datacenter (e.g., a thunderstorm, a tropical storm, etc.) In an embodiment, a man-made event is an event caused by humans which may affect the operations of a datacenter. In an embodiment, the RPO table and the RTO table may be combined into a single table as shown in the FIG. 5 example.

In an embodiment of the present invention, prediction program 334 may store data to database repository 332. In another embodiment, other applications (not shown) operating on local server 330 may store data to database repository 332. In yet another embodiment, the RTO and RPO actions for a datacenter may be stored to database repository 332. In yet another embodiment, social media data and environmental data may be stored to database repository 332. Examples of social media data stored to database repository 332 include short comments from microblog social networks, short message service (SMS) and multimedia messaging service (MMS) texts, content from social networking websites, content from local, regional, and, national news feeds, content from photo and video sharing websites, and the like. Examples of environmental data stored to database repository 332 include data from local, regional, and national news and weather services, data from weather sensors operated by the local server 330 owner, data from public weather sensors (e.g., a home weather station connected to the Internet via the Internet of Things), data from other sensors (e.g., seismic sensors, tsunami detectors, etc.), and the like.

In an embodiment, environmental data and social media data may be analyzed using Natural Language Processing (NLP), predictive analytics, cognitive computing, object recognition, video content analytics and the like. In an embodiment, NLP is a field of computer science, artificial intelligence, and computational linguistics concerned with the interactions between computers and human (natural) languages. As such, NLP is related to the area of human-computer interaction. Many challenges in NLP involve natural language understanding, that is, enabling computers to derive meaning from human or natural language input, and others involve natural language generation.

In an embodiment, predictive analytics encompasses a variety of statistical techniques from predictive modeling, machine learning, and data mining that analyze current and historical facts to make predictions about future or otherwise unknown events. In business, predictive models exploit patterns found in historical and transactional data to identify risks and opportunities. Models capture relationships among many factors to allow assessment of risk or potential associated with a particular set of conditions, guiding decision making for candidate transactions.

In an embodiment, cognitive computing involves self-learning systems that use data mining, pattern recognition and natural language processing to mimic the way the human brain works. The goal of cognitive computing is to create automated IT systems that are capable of solving problems without requiring human assistance. Cognitive computing systems use machine learning algorithms. Such systems continually acquire knowledge from the data fed into them by mining data for information. The systems refine the way they look for patterns and as well as the way they process data so they become capable of anticipating new problems and modeling possible solutions.

In an embodiment, object recognition, in the field of computer vision, describes the task of finding and identifying objects in an image or video sequence. Humans recognize a multitude of objects in images with little effort, despite the fact that the image of the objects may vary somewhat in different viewpoints, in many different sizes and scales, or even when they are translated or rotated. Objects may even be recognized when they are partially obstructed from view. Methods used may be appearance-based or feature-based.

In an embodiment, video content analytics (VCA) is the capability of automatically analyzing video to detect and determine temporal and spatial events. This technical capability is used in a wide range of domains including entertainment, health-care, retail, automotive, transport, home automation, safety and security. The algorithms can be implemented as software on general purpose machines, or as hardware in specialized video processing units. Many different functionalities can be implemented in VCA. Video Motion Detection is one of the simpler forms where motion is detected with regard to a fixed background scene. More advanced functionalities include video tracking and egomotion estimation. Based on the internal representation that VCA generates in the machine, it is possible to build other functionalities, such as identification, behavior analysis or other forms of situation awareness. VCA relies on good input video, so it is often combined with video enhancement technologies such as video denoising, image stabilization, unsharp masking and super-resolution.

According to embodiments of the present invention, prediction program 334 may be a program, subprogram of a larger program, application, plurality of applications, or mobile application software which functions to provide predictive disaster recovery of cloud services. A program is a sequence of instructions written by a programmer to perform a specific task. Prediction program 334 may run by itself but may be dependent on system software (not shown) to execute. In one embodiment, prediction program 334 functions as a stand-alone program residing on local server 330. In another embodiment, prediction program 334 may be included as a part of an operating system (not shown) of local server 330. In yet another embodiment prediction program 334 may work in conjunction with other programs, applications, etc., found on local server 330 or in computing environment 300. In yet another embodiment, prediction program 334 may be found on backup server 320 or other computing devices (not shown) in computing environment 300 which are interconnected to local server 330 via network 310. Prediction program 334 may be substantially similar to prediction orchestrator 96 in cloud computing environment 50.

According to embodiments of the present invention, prediction program 334 functions to provide predictive disaster recovery of cloud services. According to an embodiment of the present invention, prediction program 334 utilizes the social media data and the environmental data stored to database repository 332 to determine a weighted severity score (WSS) which is used to trigger actions to prevent downtime and loss of data of local server 330.

Figure 4:
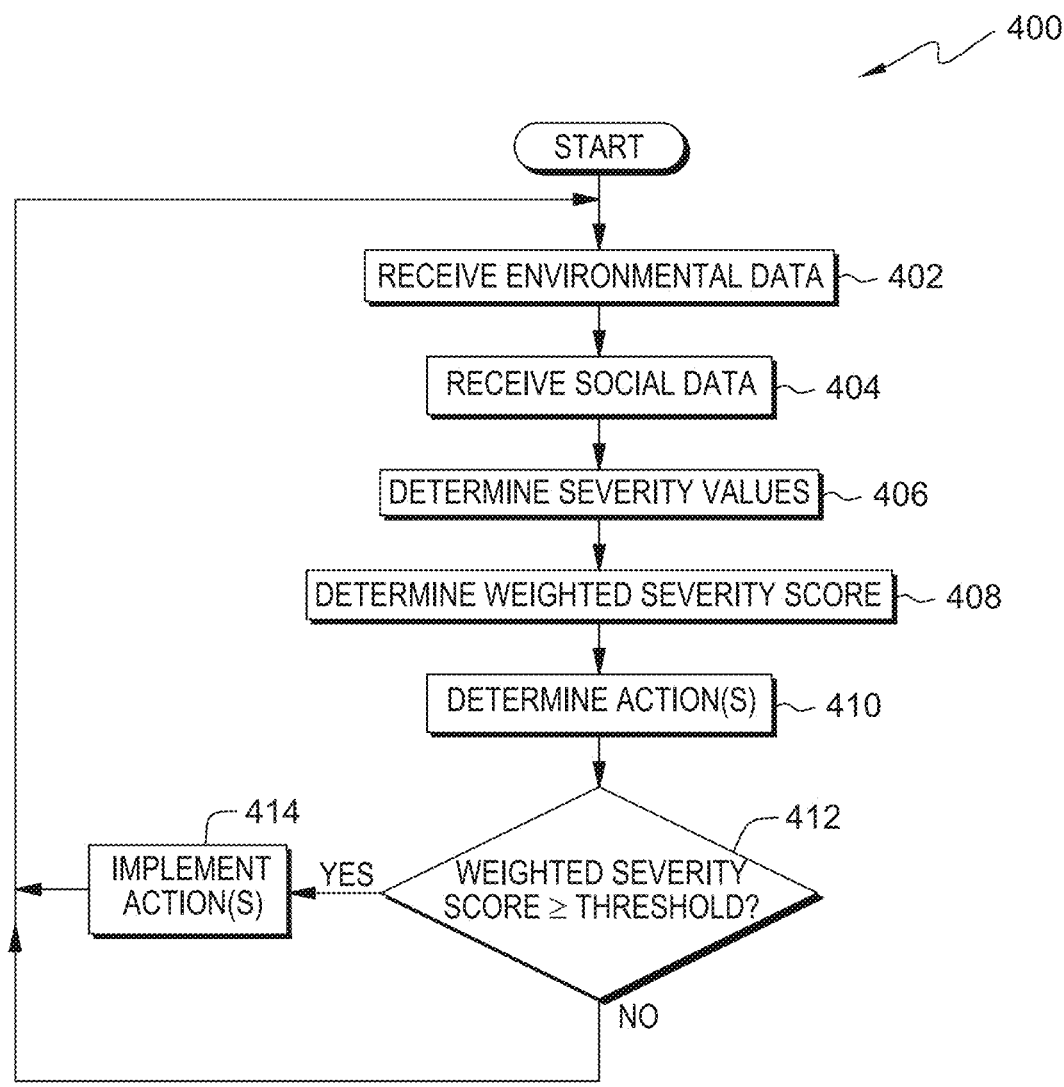
FIG. 4 is a diagram depicting operational steps of a program that functions to provide predictive disaster recovery of cloud services, in accordance with an embodiment of the present invention.

FIG. 4 is a diagram of flowchart 400 representing operational steps for providing predictive disaster recovery of cloud services, in accordance with an embodiment of the present invention. In one embodiment, prediction program 334 performs the operational steps of flowchart 400. In an alternative embodiment, any other program, while working with prediction program 334, may perform the operational steps of flowchart 400. In an embodiment, prediction program 334 may invoke the operational steps of flowchart 400 upon the request of a user. In an alternative embodiment, prediction program 334 may invoke the operational steps of flowchart 400 automatically upon the receipt of environmental data or social media data.

In an embodiment, prediction program 334 receives environmental data (step 402). In other words, prediction program 334 receives environmental data concerning the weather and potential events which may impact the capability of a datacenter (e.g., local server 330) to perform services. In an embodiment, the environmental data is received upon the request of a user. In another embodiment, the environmental data is received on a periodic time basis (e.g., every fifteen minutes, every hour, every four hours, or any periodic time basis defined by a user). In yet another embodiment, the environmental data is received whenever environmental data is made available by an environmental data source (e.g., a weather service or a news organization). In an embodiment, the data received may include data from local, regional, and national news and weather services, data from private weather sensors owned by the operator of local server 330, data from public weather sensors (e.g., a home weather station connected to the Internet via the Internet of Things), data from other sensors (e.g., seismic sensors, tsunami detectors, etc.), and the like, which may affect the operation of the datacenter. In an embodiment, prediction program 334 receives a daily weather report and any active weather watches and/or warnings and the data received is stored to database repository 332 in local server 330.

In a first example, a credit card processing datacenter receives the local weather report which indicates thunderstorms in the area where the credit card processing datacenter is located. Also received by the credit card processing datacenter is a tornado warning for the area where the credit card processing datacenter is located. In a second example, the credit card processing datacenter receives the local weather report which indicates thunderstorms but with a tornado watch rather than a tornado warning in effect in the area where the credit card processing datacenter is located. In a third example, the credit card processing datacenter receives the local weather report which indicates heavy rain for the day with hail storms possible in the area where the credit card processing datacenter is located.

In an embodiment, prediction program 334 receives social data (step 404). In other words, prediction program 334 receives social media data including short comments from microblog social networks, short message service (SMS) and multimedia messaging service (MMS) texts, content from social networking websites, content from local, regional, and, national news services, content from photo and video sharing websites, and the like, which may include information concerning situations that may affect the operation of a datacenter (e.g., local server 330). In an embodiment, the social media data is received upon the request of a user. In another embodiment, the social media data is received on a periodic time basis (e.g., every fifteen minutes, every hour, every four hours, or any periodic time basis defined by a user). In yet another embodiment, the social media data is received whenever social media data is posted, by a user, to a social media website. In an embodiment, the social media data is studied in order to glean specific data which may affect the capability of a datacenter from the global social media data. Methods of study may include NLP, predictive analytics, cognitive analysis, object recognition, video analytics, and the like. In an embodiment, prediction program 334 receives a summary of local news feeds as well as a summary of social media comments made by a plurality of users and the data received is stored to database repository 332 in local server 330.

In a first example, a credit card processing datacenter receives a summary of social media commentary which indicates that several people have observed lightning five miles from the credit card processing datacenter along with a funnel cloud in the area where the credit card processing datacenter is located. In a second example, the credit card processing datacenter receives social media commentary about thunderstorms but there is no mention of a funnel cloud in the area where the credit card processing datacenter is located. In a third example, social media commentary received by the credit card processing datacenter indicates that area residents are complaining about possible hail damage to their automobiles.

In an embodiment, prediction program 334 determines severity values (step 406). In other words, prediction program 334 determines a first severity value (SV), based on the received environmental data (step 402) and also determines a second severity value (SV), based on the received social media data (step 404). In an embodiment, the first and second SV is determined by a user. In another embodiment, the first and second SV is determined by prediction program 334 via an algorithm such as the Maximum Likelihood Estimate (MLE), the least absolute shrinkage and selection operator (LASSO), the ElasticNet (EN) and the like. In an embodiment, MLE is a method of estimating the parameters of a statistical model given data. In an embodiment, LASSO is a regression analysis method that performs both variable selection and regularization in order to enhance the prediction accuracy and interpretability of the statistical model it produces. In an embodiment, EN, in the fitting of linear or logistic regression models, is a regularized regression method that linearly combines penalties of the lasso method. In an embodiment, an SV, based on a scale of one to ten, is an indicator of how accurate, disruptive, and imminent the received environmental data and the received social media data may be to the capability of the datacenter to perform services contracted by a user of the datacenter. For example, consider a scenario where a large grass fire is near a rural datacenter. Local and state agencies (e.g., the Department of Natural Resources or the Department of Environmental Conservation) will monitor the grass fire and issue updates. The agencies may also use information from various weather services to monitor conditions that may affect the grass fire such as current wind speed and the outlook for precipitation. In this example, a grass fire ten miles from the datacenter with radar indicating heavy rain within the next thirty minutes over area where the grass fire is located may have an environmental data SV of four. However, if the grass fire were only three miles from the datacenter and prevailing winds were from the area of the grass fire towards the datacenter, the environmental data SV may be nine. According to embodiments of the present invention, a low severity value indicates that a problem is unlikely while a high severity value indicates a problem is likely. In an embodiment, prediction program 334 determines two severity values, a first based on the environmental data stored to database repository 332 on local server 330 and a second based on the social media data stored to database repository 332 on local server 330.

In a first example, an environmental SV of eight is assigned based on the environmental data of possible thunderstorms and the tornado warning near the location of the credit card processing datacenter while a social media SV of ten is assigned based on the social media data of lightning in the area and a sighting of a funnel cloud. In a second example, an environmental SV of seven is assigned based on the environmental data of possible thunderstorms and a tornado watch in effect for the location near the credit card processing datacenter while a social media SV of five is assigned based on observations of lightning only in the area of the credit card processing datacenter. In a third example, an environmental SV of three is assigned based on the environmental data of heavy rain for the day with the possibility of hail storms while a social media SV of three is assigned based on social media data indicating area residents are expressing concern over possible hail damage to automobiles.

In an embodiment, prediction program 334 determines the weighted severity score (step 408). In other words, prediction program 334 determines the weighted severity score (WSS) based on the determined environmental data severity value and the determined social media data severity value (step 406). In an embodiment, the determined environmental data SV and the determined social media data SV are added together to determine the WSS. In another embodiment, the determined environmental data SV and the determined social media data SV are averaged on a periodic time basis (e.g., every fifteen minutes, every hour, etc.) and then the two average SV scores are added to determine the WSS. In yet another embodiment, the WSS is determined based on a weighting of the determined environmental data SV and a weighting of the determined social media data SV. In yet another embodiment, the determined environmental data SV and the determined social media data SV are multiplied to yield a determined WSS between zero and one-hundred. In an embodiment, the WSS is an overall severity score for the current natural disaster or man-made event gleaned from the environmental data and the social media data.

In a first example, a WSS of eighteen is determined based on the SV of eight for the environmental data and the SV of ten for the social media data. In a second example, a WSS of twelve is determined based on the SV of seven for the environmental data and the SV of five for the social media data. In a third example, a WSS of six is determined based on the SV of three for the environmental data and the SV of three for the social media data.

In another example using weighting, the environmental data SV is multiplied by a factor of one hundred and twenty-five percent due to the environmental data being based on factual data while the social media data SV is multiplied by a factor of fifty percent due to the social media data being anecdotal (i.e., based on personal observation rather than scientific evaluation). For the example where the environmental data SV is eight and the social media data SV is ten, the weighting results in a determined WSS of fifteen (rounded to the nearest whole number) versus the previously determined WSS of eighteen using simple addition.

In an embodiment, prediction program 334 determines actions (step 410). In other words, prediction program 334 determines what RPO/RTO actions are appropriate for the determined WSS (step 408). In an embodiment, prediction program 334 refers to the applicable table stored to database repository 332 in local server 330, an example of which is shown in FIG. 5.

In an embodiment, prediction program 334 determines whether the determined WSS is equal to or greater than a threshold (decision step 412). In other words, prediction program 334 uses the determined WSS (step 408) and determines whether that determined WSS is equal to or greater than a threshold WSS value. In an embodiment, a threshold WSS value is a particular value of the WSS at which a specific RPO and/or RTO action is implemented. In an embodiment, there may be a single RPO and/or RTO threshold value (e.g., at a WSS equal to or greater than seven, take an RPO and/or RTO action). In another embodiment, there may be any number of RPO and/or RTO threshold values (e.g., at a WSS of five, take RPO action 'A', at a WSS of seven, take RTO action 'B', etc.). In an embodiment (decision step 412, NO branch), prediction program 334 determines that a WSS threshold value has not been met or exceeded; therefore, prediction program 334 proceeds to step 402 to continue receiving environmental data and social media data. In the embodiment (decision step 412, YES branch), prediction program 334 determines that a WSS threshold value has been met or exceeded; therefore, prediction program 334 proceeds to step 414.

In an embodiment, the threshold WSS value(s) may be determined by a user. In another embodiment, the threshold WSS value(s) may be determined by historical natural and man-made events along with the results of actions taken by a datacenter to mitigate those natural and man-made events. In yet another embodiment, the WSS threshold value(s) may be adjusted based on the relative importance of the data maintained by the datacenter. For example, a datacenter maintaining a history of sports records may have a high WSS threshold value for a given action (e.g., perform full data replication at a WSS threshold value of twenty). If the datacenter gains another customer that needs social security number and credit card number data maintained, the WSS threshold value may be lowered for that given action (e.g., perform full data replication at a WSS threshold value of ten) so that action may be taken sooner due to the higher importance of social security number data and credit card number data over the sports records.

In an embodiment, prediction program 334 implements an action (step 414). In other words, based on the determination that a WSS threshold value has been met or exceeded (decision step 412, YES branch), prediction program 334 implements an RPO and/or RTO action(s). According to an embodiment of the present invention, the RPO/RTO action(s) may be implemented automatically by prediction program 334. In another embodiment, the RPO/RTO action(s) may be implemented by a user. In an embodiment, an RPO action for a low WSS may be to monitor the weather or man-made situation (e.g., a civil protest). In another embodiment, an RPO action for a high WSS may be to create database backups or to perform data replication from the affected datacenter to a backup datacenter in a different geographic location. In an embodiment, in the case of a datacenter-to-datacenter replication, the affected datacenter would query the WSS for the nearby potential backup datacenters capable of handling the replication to determine the potential backup datacenter with the lowest WSS. In an embodiment, the determined WSS value may increase slowly with time (e.g., as severe weather is slowly moving into an area) resulting in multiple RPO/RTO actions being implemented at various WSS threshold values. In another embodiment, the determined WSS may increase rapidly (e.g., from a value of zero immediately to a value of twenty as in the case of a sudden earthquake) resulting in the implementation of only the RPO/RTO actions associated with the WSS value of twenty. In yet another embodiment, prediction program 334 may use historical disaster recovery events in order to improve the accuracy of the SV determination and therefore, the WSS threshold values and associated RPO/RTO actions. In an embodiment, prediction program 334 implements an RPO action to replicate the data stored to database repository 332 on local server 330 to backup server 320.

Please refer to FIG. 5 for the following examples. In a first example, the credit card processing datacenter implements an RPO action to replicate the credit card database to a backup datacenter located thirty miles away based on the current determined WSS of eighteen meeting or exceeding the WSS threshold value of eighteen. The selected backup datacenter has a current WSS of four. The backup datacenter was selected because the WSS of four was lower than all other available backup datacenters. Also, based on the determined WSS of eighteen, the datacenter implements an RTO action to bring new IT equipment online. In a second example, based on the current determined WSS of twelve meeting or exceeding the WSS threshold value of twelve, the credit card processing datacenter implements an RTO action to notify potential backup datacenters that a datacenter replication may be required and implements an RTO action to check available backup equipment both on and off site. In a third example, based on the current determined WSS of six meeting or exceeding the WSS threshold value of six, the credit card processing datacenter implements an RPO action to run local backups of the data stored by the datacenter. As shown in FIG. 5, at the WSS threshold value of six, there is no RTO action to implement but the RTO action for a WSS threshold value of three would likely have already been implemented. As also shown in FIG. 5, a WSS threshold value may have no associated RPO/RTO actions.

In another embodiment, the RPO/RTO action may be implemented manually by a user monitoring environmental data, social media data, and historical disaster recovery data via an analytics dashboard. For example, a determined WSS may be sent to a user at a remote location (i.e., not at the datacenter location for which the WSS was determined). The user may review past event history for the datacenter location for which the WSS was determined, check current environmental data and social media data related to that particular datacenter, and decide to take a specific RPO/RTO action.

In another embodiment, prediction program 334 may be used to determine when, after a natural disaster or man-made event, it is time to return to the normal state of operation (e.g., return to the original datacenter from the backup datacenter). In an embodiment, additional environmental data and additional social media data are received. A third severity value, based on the additional environmental data, is determined. A fourth severity value, based on the additional social media data, is determined. A combination of the third severity value and the fourth severity value yields a second weighted severity score. Additional RPO and additional RTO actions are determined. Each additional RPO/RTO action has a threshold. Additional RPO/RTO actions are implemented when the second weighted severity score is equal to or greater than any of the thresholds. For example, after a tornado warning and tornado watch have both expired, the determined WSS will drop from a high value to a lower value (assuming no other events are causing an increase in the determined WSS). As the determined WSS drops over time, RPO and RTO actions may be implemented to transfer responsibility from the backup datacenter to the original datacenter where operations were disrupted by the tornado warning and tornado watch.

Figure 6:
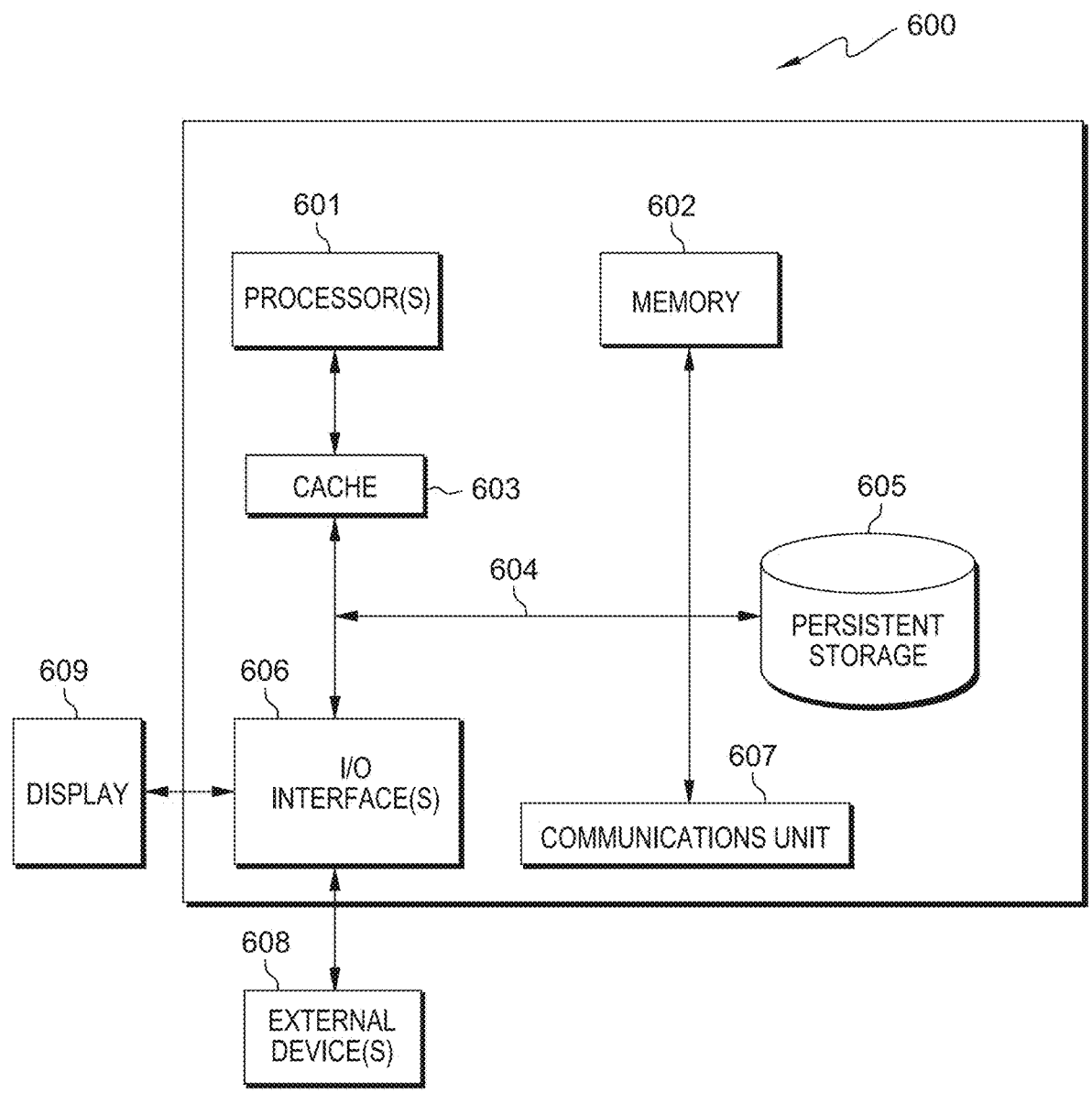
FIG. 6 depicts a block diagram of the components of the computing environment of FIG. 3, in accordance with an embodiment of the present invention.

FIG. 6 depicts computer system 600 which is an example of a system that includes prediction program 334. Computer system 600 may be an example of the backup server 320 or the local server 330 of FIG. 3. Computer system 600 includes processors 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processors 601 by holding recently accessed data, and data near recently accessed data, from memory 602.

Program instructions and data used to practice embodiments of the present invention may be stored in persistent storage 605 and in memory 602 for execution by one or more of the respective processors 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607.

I/O interface(s) 606 allows for input and output of data with other devices that may be connected to each computer system. For example, I/O interface 606 may provide a connection to external devices 608 such as a keyboard, keypad, a touch screen, and/or some other suitable input device. External devices 608 can also include portable computer readable storage media such as, for example, thumb drives, portable optical or magnetic disks, and memory cards. Software and data used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing predictive disaster recovery of cloud services, the method comprising:

receiving, by one or more computer processors, environmental data associated with a first computer;

receiving, by one or more computer processors, social media data associated with the first computer;

determining, by one or more computer processors, a first severity value based on the environmental data;

determining, by one or more computer processors, a second severity value based on the social media data;

determining, by one or more computer processors, a first weighted severity score, wherein the first weighted severity score is a combination of the first severity value and the second severity value; and responsive to determining that the determined first weighted severity score is equal to or greater than one or more thresholds, implementing, by one or more computer processors, a recovery point objective action.

2. The method of claim 1, wherein the combination of the first severity value and the second severity value is selected from the group consisting of adding the first severity value and the second severity value together, averaging the first severity value over a first periodic time basis, averaging the second severity value over a second periodic time basis, and adding the average first severity value and the average second severity value together, weighting the first severity value, weighting the second severity value, and adding the weighted first severity value and the weighted second severity value together, and multiplying the first severity value by the second severity value.

3. The method of claim 1, wherein the environmental data is selected from the group consisting of a news service, a weather service, and a weather sensor.

4. The method of claim 1, wherein the social media data includes data is selected from the group consisting of a short message service text, a multimedia messaging service text, a content from a news service, a content from a social networking website, and a content from a photo/video sharing website.

5. The method of claim 1, wherein the first severity value is determined from the group consisting of a user and an algorithm, wherein the algorithm is selected from the group consisting of the maximum likelihood estimate, the least absolute shrinkage and selection operator, and the elasticnet, and wherein the second severity value is determined from the group consisting of a user and an algorithm, wherein the algorithm is selected from the group consisting of the maximum likelihood estimate, the least absolute shrinkage and selection operator, and the elasticnet.

6. The method of claim 1, further comprising:
receiving, by one or more computer processors, additional environmental data associated with the first computer;
receiving, by one or more computer processors, additional social media data associated with the first computer;
determining, by one or more computer processors, a third severity value based on the additional environmental data;
determining, by one or more computer processors, a fourth severity value based on the additional social media data;
determining, by one or more computer processors, a second weighted severity score, wherein the second weighted severity score is a combination of the third severity value and the fourth severity value;
determining, by one or more computers, one or more actions, wherein each of the one or more actions is selected from the group consisting of a recovery point objective action and a recovery time objective action, and wherein each action of the one or more actions has a threshold;
determining, by one or more computer processors, whether the determined second weighted severity score is greater than or equal to any threshold associated with any actions of the one or more actions; and
responsive to determining that the determined second weighted severity score is greater than or equal to one or more thresholds, implementing, by one or more computer processors, the one or more actions associated with the one or more thresholds.

7. The method of claim 1, wherein the step of determining, by one or more computer processors, a second severity value based on the social media data associated with the first computer, comprises:
studying, by one or more computer processors, the social media data associated with the first computer, wherein a method of study is selected from the group consisting of natural language processing, predictive analytics, cognitive analysis, object recognition, and video analytics; and
determining, by one or more computer processors, a second severity value based on the studied social media data.

8. A computer program product for providing predictive disaster recovery of cloud services, the computer program product comprising:
one or more computer readable storage media; and
program instructions stored on the one or more computer readable storage media, the program instructions comprising:
program instructions to receive environmental data associated with a first computer;
program instructions to receive social media data associated with the first computer;
program instructions to determine a first severity value based on the environmental data;
program instructions to determine a second severity value based on the social media data;
program instructions to determine first weighted severity score, wherein the first weighted severity score is a combination of the first severity value and the second severity value; and
program instructions to, responsive to determining that the determined first weighted severity score is equal to or greater than one or more thresholds, implement a recovery point objective action.

9. The computer program product of claim 8, wherein the combination of the first severity value and the second severity value is selected from the group consisting of adding the first severity value and the second severity value together, averaging the first severity value over a first periodic time basis, averaging the second severity value over a second periodic time basis, and adding the average first severity value and the average second severity value together, weighting the first severity value, weighting the second severity value, and adding the weighted first severity value and the weighted second severity value together, and multiplying the first severity value by the second severity value.

10. The computer program product of claim 8, wherein the environmental data is selected from the group consisting of a news service, a weather service, and a weather sensor.

11. The computer program product of claim 8, wherein the social media data includes data is selected from the group consisting of a short message service text, a multimedia messaging service text, a content from a news service, a content from a social networking website, and a content from a photo/video sharing website.

12. The computer program product of claim 8, wherein the first severity value is determined from the group consisting of a user and an algorithm, wherein the algorithm is selected from the group consisting of the maximum likelihood estimate, the least absolute shrinkage and selection operator, and the elasticnet, and wherein the second severity value is determined from the group consisting of a user and an algorithm, wherein the algorithm is selected from the group consisting of the maximum likelihood estimate, the least absolute shrinkage and selection operator, and the elasticnet.

13. The computer program product of claim 8, further comprising program instructions, stored on the one or more computer readable storage media, to:
receive additional environmental data associated with the first computer;
receive additional social media data associated with the first computer;
determine a third severity value based on the additional environmental data;
determine a fourth severity value based on the additional social media data;

determine a second weighted severity score, wherein the second weighted severity score is a combination of the third severity value and the fourth severity value;
determine one or more actions, wherein each of the one or more actions is selected from the group consisting of a recovery point objective action and a recovery time objective action, and wherein each action of the one or more actions has a threshold;
determine whether the determined second weighted severity score is greater than or equal to any threshold associated with any actions of the one or more actions; and
responsive to determining that the determined second weighted severity score is greater than or equal to one or more thresholds, implement the one or more actions associated with the one or more thresholds.

14. The computer program product of claim 8, wherein the program instructions to determine a second severity value based on the social media data associated with the first computer, comprises:
program instructions to study the social media data associated with the first computer, wherein a method of study is selected from the group consisting of natural language processing, predictive analytics, cognitive analysis, object recognition, and video analytics; and
program instructions to determine a second severity value based on the studied social media data.

15. A computer system for providing predictive disaster recovery of cloud services, the computer system comprising:
one or more computer processors;
one or more computer readable storage media; and
program instructions stored on the one or more computer readable storage media for execution by at least one of the one or more computer processors, the program instructions comprising:
program instructions to receive environmental data associated with a first computer;
program instructions to receive social media data associated with the first computer;
program instructions to determine a first severity value based on the environmental data;
program instructions to determine a second severity value based on the social media data;
program instructions to determine first weighted severity score, wherein the first weighted severity score is a combination of the first severity value and the second severity value; and
program instructions to, responsive to determining that the determined first weighted severity score is equal to or greater than one or more thresholds, implement a recovery point objective action.

16. The computer system of claim 15, wherein the combination of the first severity value and the second severity value is selected from the group consisting of adding the first severity value and the second severity value together, averaging the first severity value over a first periodic time basis, averaging the second severity value over a second periodic time basis, and adding the average first severity value and the average second severity value together, weighting the first severity value, weighting the second severity value, and adding the weighted first severity value and the weighted second severity value together, and multiplying the first severity value by the second severity value.

17. The computer system of claim 15, wherein the environmental data is selected from the group consisting of a news service, a weather service, and a weather sensor.

18. The computer system of claim 15, wherein the social media data includes data is selected from the group consisting of a short message service text, a multimedia messaging service text, a content from a news service, a content from a social networking website, and a content from a photo/video sharing website.

19. The computer system of claim 15, wherein the first severity value is determined from the group consisting of a user and an algorithm, wherein the algorithm is selected from the group consisting of the maximum likelihood estimate, the least absolute shrinkage and selection operator, and the elasticnet, and wherein the second severity value is determined from the group consisting of a user and an algorithm, wherein the algorithm is selected from the group consisting of the maximum likelihood estimate, the least absolute shrinkage and selection operator, and the elasticnet.

20. The computer system of claim 15, further comprising program instructions, stored on the one or more computer readable storage media, for execution by at least one of the one or more computer processors, to:
receive additional environmental data associated with the first computer;
receive additional social media data associated with the first computer;
determine a third severity value based on the additional environmental data;
determine a fourth severity value based on the additional social media data;
determine a second weighted severity score, wherein the second weighted severity score is a combination of the third severity value and the fourth severity value;
determine one or more actions, wherein each of the one or more actions is selected from the group consisting of a recovery point objective action and a recovery time objective action, and wherein each action of the one or more actions has a threshold;
determine whether the determined second weighted severity score is greater than or equal to any threshold associated with any actions of the one or more actions; and
responsive to determining that the determined second weighted severity score is greater than or equal to one or more thresholds, implement the one or more actions associated with the one or more thresholds.

* * * * *